Aug. 14, 1928.

T. E. BARNUM ET AL

MOTOR CONTROLLER

Filed Oct. 18, 1920

1,680,495

INVENTOR
Thomas E. Barnum.
Henry N. Wade.
BY
Frank H. Hubbard
ATTORNEY

Patented Aug. 14, 1928.

1,680,495

UNITED STATES PATENT OFFICE.

THOMAS E. BARNUM, OF WAUWATOSA, AND HENRY N. WADE, OF SHOREWOOD, WISCONSIN, ASSIGNORS TO THE CUTLER-HAMMER MFG. CO., OF MILWAUKEE, WISCONSIN, A CORPORATION OF WISCONSIN.

MOTOR CONTROLLER.

Application filed October 18, 1920. Serial No. 417,693.

This invention relates to motor controllers and is particularly applicable to auto transformer starters for A. C. motors although certain features thereof are applicable to various forms of controllers for both A. C. and D. C. motors.

In practice it is frequently desired to include in the circuit of the controlled motor a transformer or other starting means for a given period of time, thereafter automatically completing running connections, and the present inventions has among its objects to provide a controller with simple and efficient means to so function.
Another object is to provide a starter wherein the time element is afforded by electro-thermally controlled means which may be connected in circuit to permit immediate restarting after stopping or alternatively connected in circuit to delay restarting for a given time.

Another object is to provide a transformer starter minimizing the number of points at which the power circuit must be made and broken.

Other objects and advantages will hereinafter appear.

Figure 1:
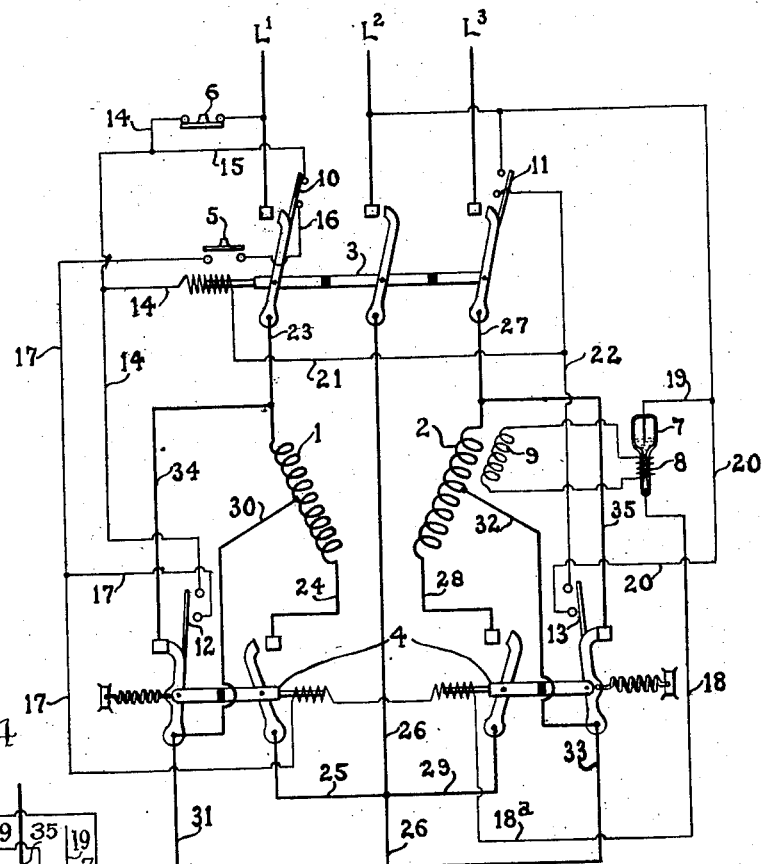
Figure 2:
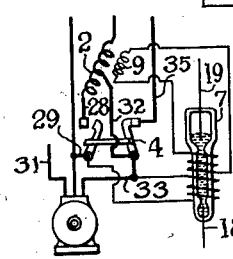
Figure 4:
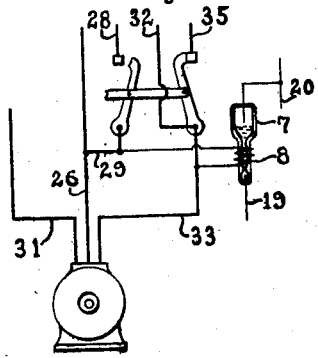
Figure 3:
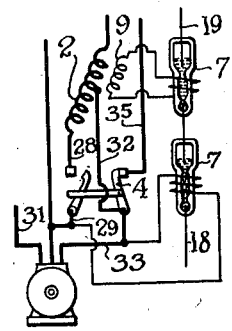

In the accompanying drawing, wherein are illustrated certain of the embodiments which the invention may assume in practice, Fig. 1 is a schematic and diagrammatic view illustrating the complete controller; while Figs. 2, 3 and 4 are similar views illustrating slight modifications of portions of the controller shown in Fig. 1.

In the drawing is shown a three phase alternating current motor M, a supply circuit $L^1$, $L^2$ and $L^3$ therefor, auto transformer coils 1 and 2 to be connected in circuit for starting, and electro-responsive switches including a three pole line switch 3 and a two pole double throw commutating switch 4 for establishing starting and running connections selectively, the latter switch being shown divided, for simplicity of illustration, and being biased to the position illustrated by means of suitable springs or otherwise.

Said switches are in turn controllable by means of a starting push button 5 and a stop button 6, the arrangement being such that energization and response of the commutating switch serve to inter-connect the trans-
former coils and to connect the motor to reduced voltage taps of said coils. Closure of the line switch during continued energization of the commutating switch serves to connect the transformer coils and the motor in the aforedescribed relation to the supply circuit, whereas, subsequent de-energization of the commutating switch and consequent return movement to the position illustrated serve to interrupt the interconnection between the transformer coils and to establish connections for the motor through the running switch directly to the supply circuit. An electrothermally responsive device 7 serves to time the aforedescribed de-energization and return movement of the commutating switch.

More particularly said timing device is preferably of the type disclosed and claimed in a copending application of Erwin R. Stoekle, S. N. 358,601, filed Feb. 14, 1920, and comprises in its essential aspects an insulating container having electrodes penetrating therewithin and normally electrically connected by a quantity of mercury. Said container is provided with a reduced portion located between the aforementioned electrodes and normally containing a portion of the mercury connection therebetween said reduced portion of the container being further surrounded by or otherwise associated with an electrical heating element 8 the arrangement being such that upon predetermined energization of such element for a given time the mercury within said restricted portion of the container becomes vaporized with consequent sudden interruption of electrical continuity of the mercury column contained therein, whereby circuit between the electrodes is interrupted. Said device is moreover inherently adapted to reset automatically upon cooling thereof.

In practice the aforedescribed timing device is arranged to control continuity of the energizing circuit of the actuating coil of commutating switch 4. The heating element 8 is arranged to be supplied with electrical energy, preferably by means of an auxiliary coil 9 arranged in inductive relation to one of the principal transformer coils as illustrated, whereby assuming constant voltage of the supply circuit, the device may be calibrated to provide for de-energization of the commutating switch following a given time element corresponding to the necessary or desired motor acceleration period.

Said switches 3 and 4 are further provided with auxiliary contacts adapted to provide electrical interlocks to prevent operation of said switches except in the desired sequence. The switch 3 is thus provided with auxiliary contacts 10 arranged to close when said switch is open and vice versa, and with a further set 11 of contacts to be closed when said switch is closed and vice versa. Similarly the switch 4 is provided with sets 12 and 13 of auxiliary contacts adapted to be closed only during energization of the actuating coil of said switch.

It is further obvious that either or both of switches 3 and 4 may be manually actuated, the windings of such switch or switches then performing only holding and releasing functions, the various interlocks and the timing device moreover performing their normal functions for maintaining the proper operative sequence subject to a suitable time element.

The operation of the controller and the various circuits involved may be described as follows: Upon closure of the starting button 5 circuit is established from line $L^1$ through stop button 6 thence by conductors 14 and 15 through auxiliary contacts 10 of the line switch 3, thence by conductor 16 through said starting button by conductor 17 through the coil of the commutating switch 4, by conductor 18 through the timing device 7, thence by conductors 19 and 20 to line $L^2$. The switch 4 thereupon responds and moves its several contacts from the position illustrated to the opposite position for effecting the connections aforedescribed.

Such action of the switch 4, also serves by means of its auxiliary contacts 12 to parallel both the starting push button 5 and the auxiliary contacts 10 of the switch 3, whereby the energizing circuit of said switch 4 is maintained irrespective of opening of said starting button and of subsequent closure of the switch 3. Also the aforementioned action of the switch 4 serves to complete the energizing circuit of the switch 3, said circuit extending from line $L^1$ through the stop button 6 as formerly traced thence by conductor 14 through the energizing coil of the switch 3 by conductors 21 and 22 through auxiliary contacts 13 of switch 4 which is now closed, thence by conductor 20 to line $L^2$. The line switch 3 thereupon closes completing the starting connections for the motor.

Said connections while obvious may be briefly described as follows. The transformer circuit may be traced from line $L^1$ through the left hand contacts of switch 3, thence by conductor 23 to and through coil 1, by conductor 24 through the left hand intermediate contacts of switch 4 by conductors 25 and 26 through the intermediate contacts of switch 3 to line $L^2$, similarly from line $L^3$ through the right hand contacts of switch 3 by conductor 27 through coil 2, by conductor 28 through the right hand intermediate contacts of switch 4 and by conductors 29 and 26 to line $L^2$ as formerly traced. The motor circuit extends from the intermediate tap of transformer coil 1 by conductors 30 and 31 through the motor to conductor 26 thence to line $L^2$ as formerly traced, also from the intermediate tap of transformer coil 2 by conductors 32 and 33 through the motor to conductor 26 and thence to line $L^2$.

Also closure of the switch 3 serves by means of its auxiliary contacts 11 to parallel the auxiliary contacts 13 of the switch 4 whereby the energizing circuit of said switch 3 is maintained irrespective of subsequent return movement of the switch 4.

It is furthermore apparent that upon energization of the transformer windings due to the aforementioned closure of switch 3 the coil 9 is energized for supplying current to the heating element 8 of the timing device 7 and following a predetermined time interval said device is adapted to respond in the manner aforedescribed for interruption of the energizing circuit of the switch 4. Said switch is thereupon adapted to return automatically to the position illustrated thereby interrupting the interconnections of the transformer coils and the connections of said coils to line $L^2$, and also serving to shunt said coils through conductors 34 and 35 for establishing connections for the motor through the line switch 3 directly to the supply circuit.

Such return movement of switch 4 also serves through opening of its auxiliary contacts 12 to provide against re-establishment of the energizing circuit of said switch following subsequent automatic resetting of the timing device 7. Also under the foregoing conditions it is to be noted that closure of switch 3 serves through opening of its auxiliary contacts 10 to provide against re-energization of the switch 4 following accidental or unauthorized actuation of the start button after conductivity of the timing device 7 has been reestablished.

Stopping of the motor is effected by opening the stop button 6 thereby de-energizing the circuit of the switch 3 which thereupon opens and disconnects the motor and transformer from the supply circuit.

In addition to its aforedescribed functions the timing device 7 being thus responsive to the electrical condition of the transformer is adapted to afford protection to the same by preventing unduly prolonged energization thereof. Also from the for going description it is obvious that said device is de-energized following return movement of the starting switch 4 and hence is adapted to reset itself, thereby providing for immediate restarting of the motor following stopping thereof.

On the other hand, where immediate restarting of the motor is not desired, it is possible to connect the heating element 8 directly across one phase of the motor circuit as illustrated in Fig. 2. Under such conditions the timing device is rendered responsive immediately upon establishment of starting connections and is moreover calibrated to cause establishment of running connections subject to a suitable time element. The element 8 being continuously energized during energization of the motor, the device is prevented from resetting during running and until a given time after stopping of the motor, restarting being consequently delayed during such period.

Should it be desired to thus provide against immediate restarting and also to provide the aforedescribed protection of the transformer, it is possible to employ two timing devices arranged in series in the energizing circuit of the switch 4, the individual heating elements of said devices being connected as illustrated in Fig. 3 of the drawing. Also a similar result may be obtained by providing a single timing device as shown in Fig. 4, said device having one heating element connected as illustrated in Fig. 1 and also provided with an auxiliary heating element connected as in Fig. 2, such latter element being so designed as to be substantially inactive during the starting period, its function being to prevent cooling of the device sufficiently to permit resetting thereof until a given time after stopping of the motor.

The aforedescribed construction and arrangement thus provide for full automatic control of a transformer starter while requiring but seven points at which the power circuit is made or broken, that is to say, one more than twice the number of lines in the supply circuit. Moreover, the aforedescribed system of interlocks serves to insure against operation of said switches except in the manner aforedescribed and also provides against unwarranted re-establishment of the closing circuit of any of said switches, while the particular character of the device 7 provides for accurate electro-thermally responsive timing of the automatic functions of the controller.

What we claim as new and desire to secure by Letters Patent is:

1. In a motor controller the combination with means for establishing different power connections selectively of means for timing establishment of certain of said connections by said former means, said latter means including a normally closed electro-thermal relay energized inductively by the main current and responsive subject to a time element.

2. In a motor controller, the combination with means for establishing starting and running connections selectively, said means including an element normally positioned to establish running connections and requiring operation and retention to establish and maintain starting connections, and further including an electro-magnet to retain said element in starting position, of means for timing establishment of running connections by said former means, said latter means including a normally closed electro-thermal relay responsive subject to a time element upon establishment of starting connections.

3. In a motor controller the combination with means operable to establish starting connections, said means including electro-magnetically restrained means releasable to establish running connections, of circuit controlling means including a fluid through which the energized circuit of the latter means is completed and means for subjecting such fluid to thermal influences upon completion of the motor circuit to effect de-energization of said electro-magnetically restrained means subject to a time element.

4. In a motor controller the combination with means for establishing starting and running connections selectively, said means including electro-magnetically restrained means releasable to effect establishment of running connections and an electro-responsive switch to de-energize said electro-magnetically restrained means, said switch having a heating coil dependent for energization upon establishment of certain of said first-mentioned connections.

5. In a motor controller the combination with means for establishing power connections for the motor, of electro-thermal means controlling said first-mentioned means and influenced by the establishment of said power connections to subject said first-mentioned means to a time element in re-establishing such connections following interruption thereof under normal conditions.

6. In a motor controller the combination with means for establishing starting and running connections selectively, of electro-thermal means responsive subject to a time element upon establishment of starting connections to time the establishment of running connections by said means, said electro-thermal means also acting upon establishment of running connections to subject said first-mentioned means to a time element in re-establishing the motor connections following interruption thereof.

7. In a motor controller the combination with means for establishing starting and running connections selectively, said means including electro-responsive switches requiring energization for establishment of either starting or running connections and further including electro-magnetically restrained switches requiring energization to maintain the starting connections and tending when de-energized to establish running connections, of electro-thermal means responsive to de-energize said electro-magnetically restrained means and to prevent re-energization of said electro-responsive means, said electro-thermal means being responsive subject to a delay upon establishment of starting connections and being maintained responsive throughout the period of establishment of running connections.

8. The combination with an alternating current motor, a plurality of transformer coils and a supply circuit, of a controller operable for connection of said coils to said supply circuit and completion of the circuit of said motor inclusive of said coils and thereafter operable for connection of the motor directly to said supply circuit and disconnection of said coils from said supply circuit, and electro-responsive means for timing the action of said controller, said means being dependent for energization upon connection of said coils to said supply circuit.

9. The combination with an alternating current motor, a plurality of transformer coils and a supply circuit, of a controller operable for connection of said coils to said supply circuit and completion of the circuit of said motor inclusive of said coils and thereafter operable for connection of the motor directly to said supply circuit, and disconnection of said coils from said supply circuit, and an electro-thermally responsive device for timing said latter mentioned operation of said controller, said device being dependent for energization upon said first-mentioned operation of said controller.

10. The combination with an alternating current motor, a plurality of transformer coils and a supply circuit, of a circuit controller having jointly movable contactors biased to a given circuit controlling position and movable electro-magnetically to a different circuit controlling position for interconnection of said coils and connection of the motor to intermediate points of said coils, a second circuit controller having jointly movable contactors to be operated electro-magnetically for connection of said coils to said supply circuit and completion of the circuit of said motor inclusive of said coils and an electro-thermally responsive device arranged to interrupt the energizing circuit of said first-mentioned circuit controller subject to a time element for permitting said circuit controller to move into its biased position for connection of the motor directly to said supply circuit and interruption of the interconnection of said transformer coils.

11. The combination with an alternating current motor a plurality of transformer coils and a supply circuit of a circuit controller having jointly movable contactors biased to a given circuit controlling position and movable electro-magnetically to a different circuit controlling position for interconnection of said coils and connection of the motor to intermediate points of said coils, a second circuit controller having jointly movable contactors to be operated electro-magnetically for connection of said coils to said supply circuit and completion of the circuit of said motor inclusive of said coils and an electro-thermally responsive device arranged to interrupt the energizing circuit of said first-mentioned circuit controller subject to a time element for permitting said circuit controller to move into its biased position for connection of the motor directly to said supply circuit and interruption of the interconnection of said transformer coils, said circuit controllers being provided with interlocks preventing operation thereof except in a given cycle.

12. In a motor controller, the combination with a plurality of normally open and a plurality or normally closed switches, interlinked electromagnetic means for closing certain of said normally open switches and opening said normally closed switches prior to closure of other of said switches to thereby interpose between said motor and a source of supply a plurality of transformer coils, and electro-thermally responsive means associated with said source of supply and said electromagnetic means for interrupting the interconnection of said coils and connection of the motor directly to said source of supply subject to a time element.

13. In a motor controller, the combination with a plurality of switches interposed between said motor and a supply circuit, certain of said switches being normally open and other of said switches being normally closed, electromagnetic means for substantially simultaneously reversing the position of all of said switches to interpose a plurality of transformer coils between said supply circuit and said motor in starting the latter, and electro-thermally responsive means associated with said supply circuit and said electro-magnetic means for again reversing the position of certain of said switches for interruption of the interconnection of said coils and connection of the motor directly to said supply circuit.

14. In a controller for alternating current motors, the combination with an auto-transformer, of means to establish selectively circuit connections for the motor comprising starting connections involving the transformer, and running connections, and means controlled by flux of the starting inductance to provide a time element between establishment of starting and running connections of the motor.

15. In a controller for alternating current motors, the combination with an auto-transformer, of means to establish selectively circuit connections for the motor comprising starting connections involving the transformer, and running connections, and electro-thermally responsive means controlled by flux of the starting inductance to provide a time element between establishment of starting and running connections of the motor.

16. In a motor controller, the combination with electro-magnetically restrained means for establishing starting connections, and an electro-thermally responsive switch to release said electro-magnetically restrained means for establishment of running connections, said switch having a heating coil adapted for inductive energization by the main current upon establishment of certain of said connections.

17. In a controller for electric motors, the combination with means for establishing selectively starting and running connections for the motor, of electro-thermally acting means to be inductively influenced by current of the motor supply circuit upon completion of starting connections for timing subsequent establishment of running connections.

In witness whereof, we have hereunto subscribed our names.

THOMAS E. BARNUM.
HENRY N. WADE.